US012755199B2

United States Patent
(12) United States Patent
Santhar et al.

(10) Patent No.: US 12,755,199 B2
(45) Date of Patent: Oct. 6, 2026

(54) CLUSTERED ENCODING AND DECODING FROM A LATENT PROBABILITY DISTRIBUTION

(71) Applicant: International Business Machines Corporation, Armonk, NY (US)

(72) Inventors: Sathya Santhar, Chennai (IN); Sridevi Kannan, Chennai (IN); Suvedhahari Velusamy, Irving, TX (US); Samuel Mathew Jawaharlal, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 828 days.

(21) Appl. No.: 18/172,509

(22) Filed: Feb. 22, 2023

(65) Prior Publication Data

US 2024/0281704 A1 Aug. 22, 2024

(51) Int. Cl.
*G06N 20/00* (2019.01)
*G06N 7/01* (2023.01)

(52) U.S. Cl.
CPC ............... *G06N 20/00* (2019.01); *G06N 7/01* (2023.01)

(58) Field of Classification Search
CPC ................................ G06N 20/00; G06N 7/01
See application file for complete search history.

(56) References Cited

U.S. PATENT DOCUMENTS

| | | | | |
|---|---|---|---|---|
| 10,885,111 | B2 | 1/2021 | Chaudhury et al. | |
| 2006/0222079 | A1* | 10/2006 | Park | H04N 21/2365 375/E7.031 |
| 2019/0318040 | A1* | 10/2019 | Chaudhury | G06N 3/094 |
| 2020/0327186 | A1* | 10/2020 | Phelps | G06F 17/16 |
| 2022/0166976 | A1* | 5/2022 | Choo | H04N 19/12 |

FOREIGN PATENT DOCUMENTS

WO WO-2015011688 A2 * 1/2015 ............. G06N 3/045

OTHER PUBLICATIONS

Li, Xiaopeng, Zhourong Chen, Leonard KM Poon, and Nevin L. Zhang. "Learning latent superstructures in variational autoencoders for deep multidimensional clustering." arXiv preprint arXiv:1803. 05206 (2018). (Year: 2018).*

(Continued)

*Primary Examiner* — Casey R. Garner
(74) *Attorney, Agent, or Firm* — Amin, Turocy & Watson, LLP

(57) ABSTRACT

One or more systems, devices, computer program products and/or computer-implemented methods of use provided herein relate to a process to facilitate learning a model for clustered encoding and decoding from a latent probability distribution. A computer implemented method can comprise mapping, by a system operatively coupled to a processor, high-dimensional modalities of data from one or more latent probability distributions corresponding to a plurality of encoder and decoder pairs to a plurality of independent latent spaces. The computer implement method can also comprise mapping, by the system, the plurality of independent latent spaces to a common latent space representing one or more features of one or more input classes associated with the plurality of encoder and decoder pairs.

19 Claims, 9 Drawing Sheets

(56) References Cited

OTHER PUBLICATIONS

Schonfeld, et al., "Generalized Zero- and Few-Shot Learning via Aligned Variational Autoencoders," 2019 IEEE/CVF Conference on Computer Vision and Pattern Recognition (Published: CVPR—Jun. 15-20, 2019), DOI 10.1109/CVPR.2019.00844.
Liu, et al., "Unsupervised Image-to-Image Translation Networks," 31st Conference on Neural Information Processing Systems (Published: NIPS Dec. 4 through Sat the 9th, 2017), Long Beach, CA, USA.
Chartsias, et al., "Multimodal MR Synthesis via Modality-Invariant Latent Representation," IEEE Transactions on Medical Imaging, Date of Publication: Oct. 18, 2017, DOI 10.1109/TMI.2017.2764326.
Ternes, et al., "A multi-encoder variational autoencoder controls multiple transformational features in single-cell image analysis," Communications Biology | (Published: Mar. 23, 2022) 5:255 | https://doi.org/10.1038/s42003-022-03218-x.
Jo, et al., "Associative Variational Auto-Encoder with Distributed Latent Spaces and Associators," vol. 34 No. 07: AAAI-20 Technical Tracks 7, DOI: https://doi.org/10.1609/aaai.v34i07.677, Published: Apr. 3, 2020.
Sumi, et al., "Modality Conversion of Handwritten Patterns by Cross Variational Autoencoders," arXiv:1906.06142v1 [cs.CV] Published: Jun. 14, 2019.
Morzhakov, "Sets of autoencoders with shared latent spaces," arXiv:1811.02373v1 [cs.CV] Published: Nov. 16, 2018.
Wan, et al., "Crossing Nets: Combining GANs and VAEs with a Shared Latent Space for Hand Pose Estimation," Published in: Jul. 21-26, 2017, IEEE Conference on Computer Vision and Pattern Recognition (CVPR), DOI: 10.1109/CVPR.2017.132.

* cited by examiner

CLUSTERED ENCODING AND DECODING FROM A LATENT PROBABILITY DISTRIBUTION

BACKGROUND

One or more embodiments described herein relate generally to learning a model for clustered encoding and decoding from a latent probability distribution. Embodiments relate to generating a latent probability distribution representing a likelihood of different multidimensional images associated with the model, and more specifically, to systems and method to facilitate mapping high-dimensional modalities of data from a latent probability distribution to a plurality of independent latent spaces and to a common latent space.

SUMMARY

The following presents a summary to provide a basic understanding of one or more embodiments described herein. This summary is not intended to identify key or critical elements or delineate any scope of the particular embodiments or any scope of the claims. The sole purpose of the summary is to present concepts in a simplified form as a prelude to the more detailed description that is presented later. In one or more embodiments described herein, systems, devices, computer-implemented methods, and/or computer program products that facilitate clustered encoding and decoding from one or more latent probability distributions are described.

According to an embodiment, a computer implemented method for learning a model for clustered encoding and deciding from a latent probability distribution can comprise mapping, by a system operatively coupled to a processor, high-dimensional modalities of data from one or more latent probability distributions corresponding to a plurality of encoder and decoder pairs to a plurality of independent latent spaces. The computer implemented method can additionally comprise mapping, by the system, the plurality of independent latent spaces to a common latent space that can represent one or more features of one or more input classes associated with the plurality of encoder and decoder pairs, wherein the latent probability distribution can represent a likelihood of different multi-dimensional images input to encoders of the plurality of encoder and decoder pairs via multi-stage latent learning.

According to another embodiment, a computer program product for learning a model for clustered encoding and decoding from a latent probability distribution, the computer program product comprising a computer readable storage medium having program instructions embodied therewith, the program instructions executable by a processor to cause the processor to map, by the processor, high-dimensional modalities of data from one or more latent probability distributions that can correspond to a plurality of encoder and decoder pairs to a plurality of independent latent spaces. Additionally, the computer program product can cause the processor to map, by the processor, the plurality of independent latent spaces to a common latent space that can represent one or more features of one or more input classes associated with the plurality of encoder and decoder pairs, wherein the latent probability distribution can represent a likelihood of different multi-dimensional images input to each of encoder of the plurality of encoder and decoder pairs via multi-stage latent learning.

According to yet another embodiment, a system for learning a model for clustered encoding and decoding from a latent probability distribution, can comprise a memory that stores computer executable components, and a processor that can execute the computer executable components stored in the memory. The computer executable components can comprise a plurality of encoder and decoder pairs that can map high-dimensional modalities of data from a latent probability distribution to a plurality of independent latent spaces. Additionally, the processor can combine the plurality of independent latent spaces to generate a common latent space that represents one or more features of one or more input classes associated with the plurality of encoder and decoder pairs; and the latent probability distribution can represent a likelihood of different multi-dimensional images input to each encoder of the plurality of encoder and decoder pairs via multi-stage latent learning.

DETAILED DESCRIPTION

Figure 1:
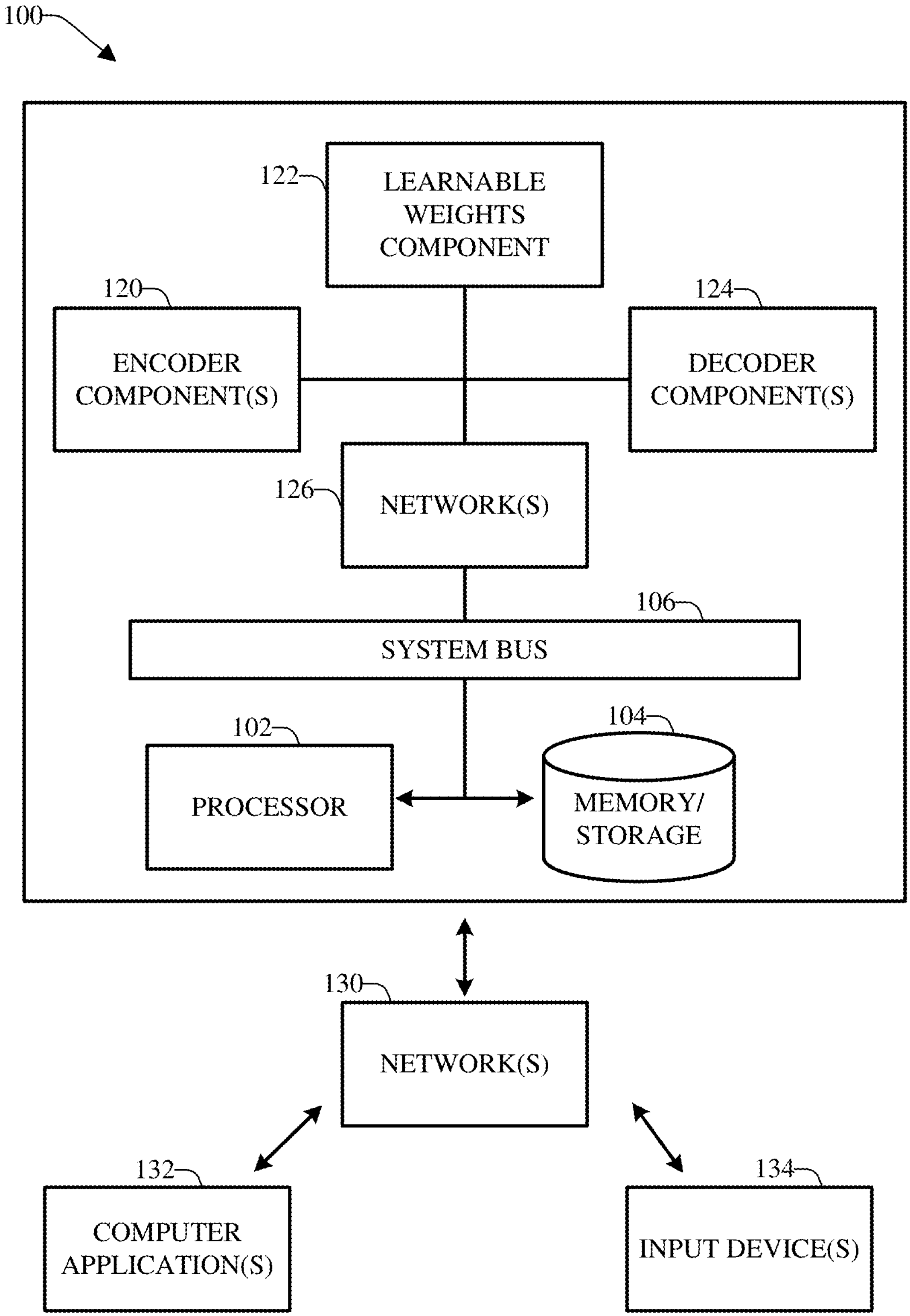
FIG. 1 illustrates a block diagram of an example, non-limiting system that can facilitate learning a model for clustered encoding and decoding from a latent probability distribution, in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in this Detailed Description section.

In some cases, it can be desirable to reduce the amount of information transmitted over a network for one or more of a variety of reasons, including, but not limited to, data transmission efficiency, speed, and/or accuracy. Encoders (e.g., autoencoders, variational encoders, etc.) and decoders can be used to transmit and receive reduced quantities of information while preserving the accuracy of the input information and the output information. Encoders can be suitable for estimating the probability density function of input images which can be used by the decoders to reconstruct the original images. If a trained model can be fed untrained images, the probability density function can help pick the closest vector from the latent space to construct an image (which is close to the trained images in the original space as the training dataset). The training data can define the density of the input data (e.g., the input images). Encoders can receive a particular image of an image class (e.g., a digit) and can use probability distributions to transmit the image to latent space (which can then be sent over the network), by which a decoder can generate the original image. Encoders can share the same latent space when the properties of the images fed to the model do not change much; however, problems arise if the images include varying levels of depths and weights.

Nonetheless, even though results can be provided, a problem associated with encoding and decoding from latent space is that they lack the desired ability or robustness to encode and decode different and irrelevant images at the same time from a latent probability distribution. Given this problem, one or more embodiments described herein can be implemented to produce a solution to one or more of these problems in the form of systems, computer-implements methods, and/or computer program products that can facilitate encoding and decoding from a latent probability distribution representing the likelihood of different multi-dimensional images via multi-stage latent learning in which multiple encoders learn the characteristics of different and irrelevant images at the same time. The different and irrelevant images can belong to a particular category or class for each encoder. Alternatively, the encoders can receive a series of frames representing sequential images in a particular timeframe for decoding.

Further, one or more embodiments described herein can be implemented to produce a solution that can facilitate the following processes: i) mapping, by the processor, high-dimensional modalities of data from a latent probability distribution corresponding to a plurality of encoder and decoder pairs to a plurality of independent latent spaces; ii) mapping, by the processor the plurality of independent latent spaces to a common latent space representing one or more features of one or more input classes associated with the plurality of encoder and decoder pairs; and iii) the latent probability distribution represents a likelihood of different multi-dimensional images input to the plurality of encoder and decoder pairs via multi-stage latent learning. That is, embodiments described herein include one or more systems, computer implemented methods, apparatuses and/or computer program products that can facilitate one or more of the aforementioned processes.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 800 illustrated at FIG. 8. In one or more described embodiments, computer and/or computing-based elements can be used in connection with implementing one or more of the systems, devices, components and/or computer-implemented operations shown and/or described in connection with FIG. 1 and/or with other figures described herein.

FIG. 1 illustrates a block diagram of an example, non-limiting system 100 that enables learning a model for clustered encoding and decoding from a latent probability distribution in accordance with one or more embodiments described herein. Further, the system 100 can utilize latent probability distributions to represent a likelihood of different multi-dimensional images input to the encoder component(s) 120 via multi-stage latent learning. System 100 can comprise processor 102, memory 104, system bus 106, encoder component(s) 120, learnable weights component 122, and decoder component(s) 124.

Discussion first turns to processor 102, memory 104 and bus 106 of system 100. For example, in one or more embodiments, the system 100 can comprise processor 102 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 102 to enable performance of one or more processes defined by such component(s) and/or instruction(s).

In one or more embodiments, system 100 can comprise a computer-readable memory (e.g., memory/storage 104) that can be operably connected to the processor 102. Memory 104 can store computer-executable instructions that, upon execution by processor 102, can cause processor 102 and/or one or more other components of system 100 (e.g., encoder component(s) 120, learnable weights component 122, and decoder component(s) 124) to perform one or more actions. In one or more embodiments, memory 104 can store computer-executable components (e.g., encoder component(s) 120, learnable weights component 122, and decoder component(s) 124).

With embodiments, system 100 can include (or be connected with) a network 126 that can be coupled with the encoder component(s) 120, the learnable weights component 122, the decoder component(s) 124, and the system bus 106. System 100 can transmit information between the encoder component(s) 120, the learnable weights component 122, and the decoder component(s) via the network 126. Further, such information (that which can be sent between the encoder component(s) 120, the learnable weights component 122, and the decoder component(s) 124 can be transmitted between the processor 102, the memory 104, and the system bus 106.

System 100 and/or a component thereof as described herein, can be communicatively, electrically, operatively, optically and/or otherwise coupled to one another via bus 106. Bus 106 can comprise one or more of a memory bus, memory controller, peripheral bus, external bus, local bus, and/or another type of bus that can employ one or more bus architectures. One or more of these examples of bus 106 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via an additional network 130. The network 126 can be connected with the additional network 130 such that information can be transmitted therebetween. In embodiments, the network 126 and the additional network 130 can be portions of the same network. In one or more embodiments, one or more of the components of system 100 can reside in the cloud, and/or can reside locally in a local computing environment (e.g., at a specified location(s)).

In addition to the processor 102 and/or memory 104 described above, system 100 can comprise one or more computer and/or machine readable, writable and/or executable components and/or instructions that, when executed by processor 102, can enable performance of one or more operations defined by such component(s) and/or instruction(s). System 100 can be associated with, such as accessible via, a computing environment 800 described below with reference to FIG. 8. For example, system 100 can be associated with a computing environment 800 such that aspects of processing can be distributed between system 100 and the computing environment 800. Aspects of systems, apparatuses, or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Figure 8:
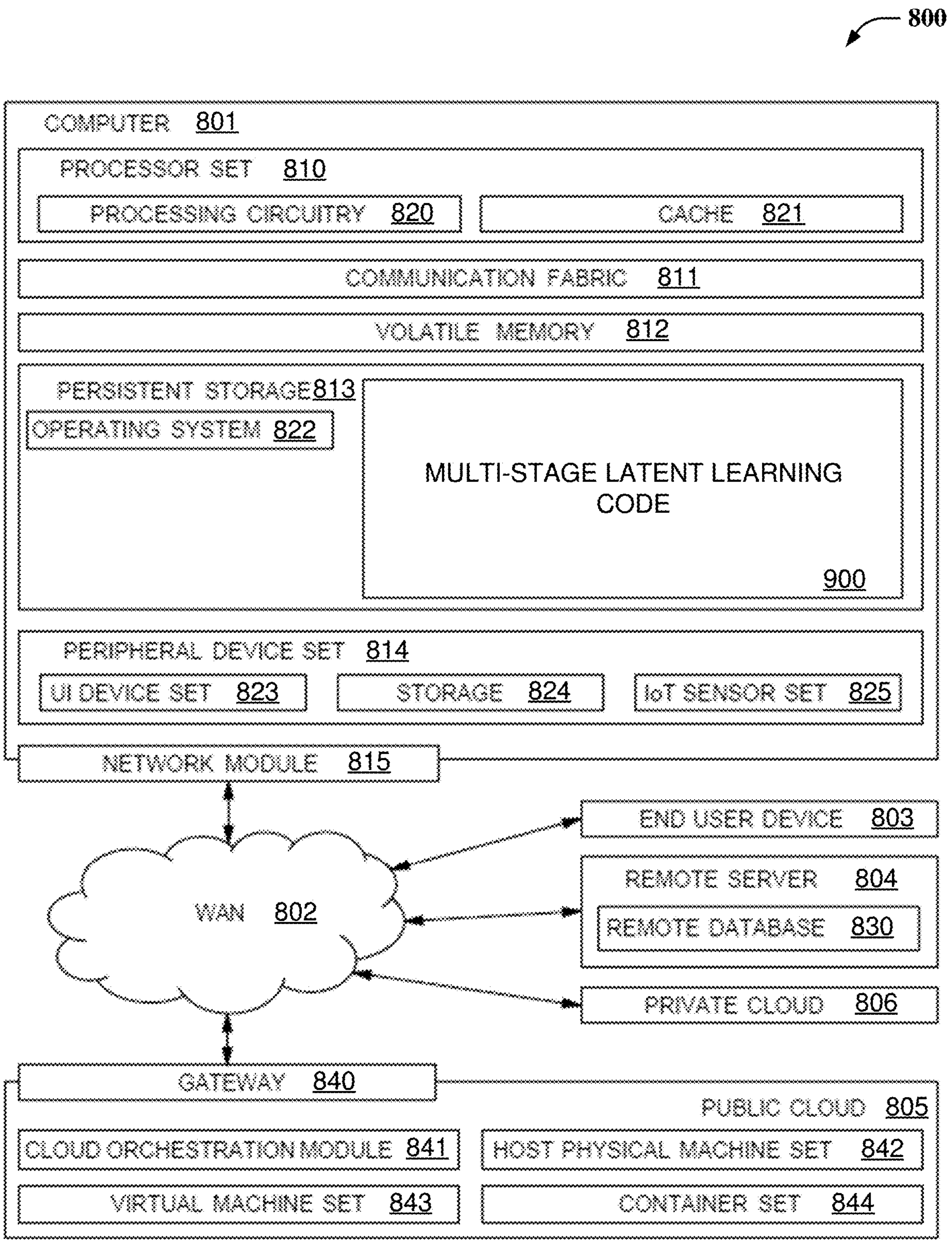
FIG. 8 illustrates a block diagram of an example, non-limiting operating environment in which one or more embodiments described herein can be facilitated.

The encoder component(s) 120 can be operatively linked with the learnable weights component 122, and the decoder component(s) 124, such as to learn a model for clustered encoding and decoding from a latent probability distribution. The system 100 can be connected with the processor 102, the memory/storage component 104, the system bus 106, one or more networks 126, 130, one or more computer applications 132, and one or more input devices 134, which can be associated with cloud computing environment 800 (FIG. 8).

FIG. 1 illustrates a block diagram of an example, non-limiting system 100 that comprises the encoder component(s) 120, the learnable weights component 122, and the decoder component(s) 124. The encoder component(s) 120 can comprise a plurality of encoders that can be associated with a plurality of decoders of the decoder component(s) 124. The plurality of encoders can be communicatively connected (e.g., transmit information) with the plurality of decoders via the network 126. Further, the network 126 can store and/or manage information of the plurality of encoders, the plurality of decoders, and the learnable weights component 122. The system 100 can generate a common latent space for the plurality of encoders, and the plurality of decoders can decode information from the common latent space. The plurality of encoders can generate a plurality of independent latent spaces that can be combined to create the common latent space. Learnable weights can be applied (e.g., multiplied) to the plurality of latent spaces in generating the common latent space, such that respective decoders of the plurality of decoders can identify the associated encoder of the plurality of encoders. Additionally, information relating to the encoder component(s) 120, the learnable weights component 122, and the decoder component(s) can be transmitted by the system over the network 126 and the additional network 130 for integration with computer applications 132 and input device(s) 134.

Figure 2:
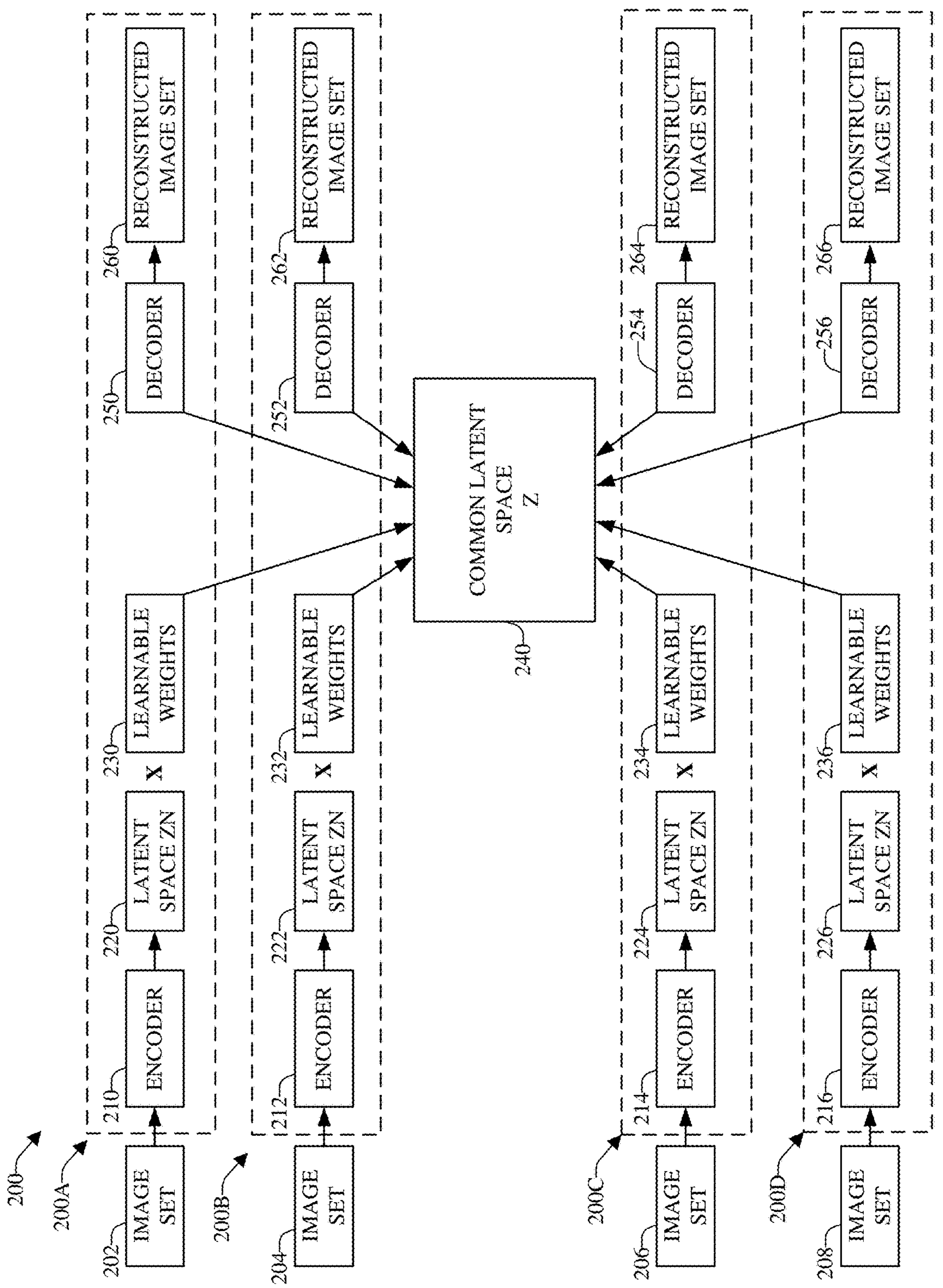
FIG. 2 illustrates a block diagram of an example, non-limiting system that can facilitate learning a model for clustered encoding and decoding from a latent probability distribution, in accordance with one or more embodiments described herein.
Figure 3:
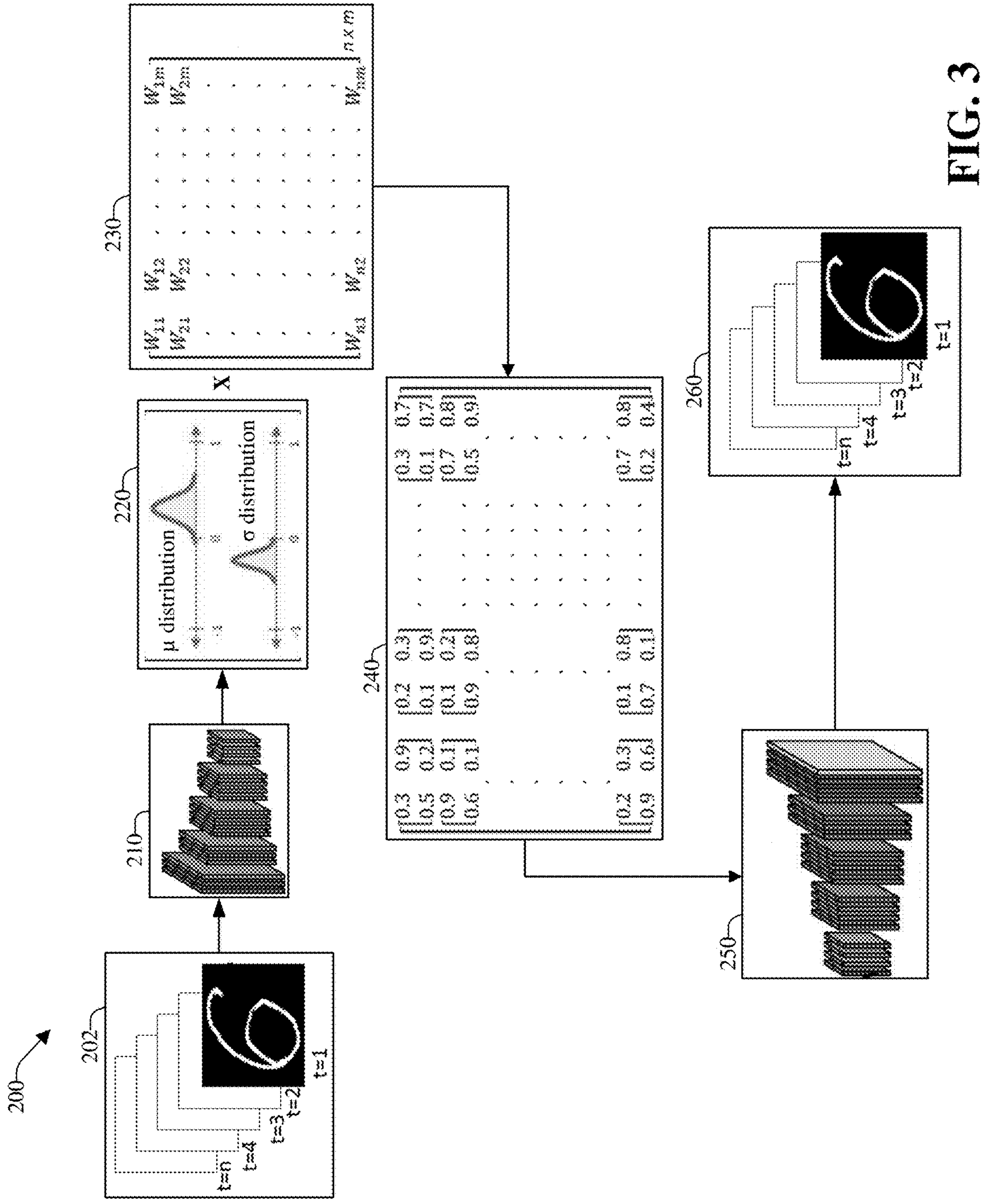
FIG. 3 illustrates a block diagram of an example, non-limiting system that can facilitate learning a model for clustered encoding and decoding from a latent probability distribution, in accordance with one or more embodiments described herein.

Such as generally illustrated in FIGS. 2 and 3, the system 200 can include a first image set 202, a second image set 204, a third image set 206, and a fourth image set 208. The image sets 202, 204, 206, 208 can include one more of a variety of images having a variety of features (e.g., images of different classes or categories). For example and without limitation, the image sets 202, 204, 206, 208 can include text, animal images, garment images, and/or handwritten digits. The first image set 202, the second image set 204, the third image set 206, and the fourth image set 208 can be used for different purposes, such as for text and image distribution. The first image set 202, the second image set 204, the third image set 206, and the fourth image set 208 can include images with varying levels of depths and weights.

With embodiments, the image sets 202, 204, 206, 208 can be transmitted to a plurality of encoders including a first encoder 210, a second encoder 212, a third encoder 214, and a fourth encoder 216. The encoders 210, 212, 214, 216 can be connected with the network 126 and/or the additional network 130 (e.g., see FIG. 1) to facilitate receiving information from the image sets 202, 204, 206, 208. Further, the encoders 210, 212, 214, 216 can be one or more of a variety of encoders (e.g., autoencoders, variational encoders, LSTM encoders) appropriate for receiving a particular type of image associated with the various image sets 202, 204, 206, 208.

Additionally, the encoders 210, 212, 214, 216 can be conditioned/trained to learn the characteristics and features of different images from the image sets 202, 204, 206, 208 at the same time. The different images can belong to different categories for the encoders 210, 212, 214, 216. For example and without limitation, the first image set 202 can be associated with a first category including handwritten digits, the second image set 204 can be associated with a second category including garment images, the third image set 206 can be associated with a third category including airplane images, and the fourth image set 208 can be associated with a fourth category including animal images. Additionally or alternatively, the encoders 210, 212, 214, 216 can receive a series of frames representing sequential images in a particular timeframe for transmission (e.g., video frames). For example, the encoders 210, 212, 214, 216 can be trained to receive different categories of video frames (e.g., animated movies, news feeds, etc.). In further examples, the encoders 210, 212, 214, 216 can include a pair of orientation-based encoders and decoders to define latent spaces for different orientations of the images of the respective first category, second category, third category, and fourth category.

In embodiments, the first encoder 210 can receive the first image set 202 and can generate a first independent latent space 220 ($Z_{n1}$) representing the probability distribution of the input images of the first image set 202. The first independent latent space 220 can include the mean distribution (e.g., the spread of mean of all the pixels in the image) and standard deviation (e.g., the spread of standard deviation of all the pixels in the image) for each image of the first image set 202. The second encoder 212 can receive the second image set 204 and can generate a second independent latent space 222 ($Z_{n2}$) representing the probability distribution of the input images of the second image set 204. The second independent latent space 222 can include the mean distribution and standard deviation for each image of the second image set 204. Similarly, the third encoder 214 can receive the third image set 206 and can generate a third independent latent space 224 ($Z_{n3}$) representing the probability distribution of the input images of the third image set 206. The third independent latent space 224 can include the mean distribution and standard deviation for each image of the third image set 206.

Additionally, the fourth encoder 216 can receive the fourth image set 208 and can generate a fourth independent latent space 226 ($Z_{n4}$) representing the probability distribution of the input images of the fourth image set 208. The fourth independent latent space 226 can include the mean distribution and standard deviation for each image of the fourth image set 208. With examples, the system 200 can include an independent latent space 220, 222, 224, 226 for each encoder and decoder pair (e.g., a first pair 200A associated with the first image set 202, a second pair 200B associated with the second image set 204, a third pair 200C associated with the third image set 206, and a fourth pair 200D associated with the fourth image set 208). The independent latent spaces 220, 222, 224, 226 can be expressed by Equation (1): $Z_n=\sigma(W_x+b)$.

With embodiments, such as generally shown in FIGS. 1, 2, and 3, the processor 102 and/or the learnable weights component 122 can generate learnable weights matrices ω (e.g., comprising an n×m dimension) for the encoder component(s) 120 (e.g., the first encoder 210, the second encoder 212, the third encoder 214, and the fourth encoder 216). The learnable weights matrices can be a hyper-parameter for the system 200 to be tuned to equilibrium (e.g., a global minimum of loss). The processor 102 can generate a first learnable weights matrix 230 associated with the first image set 202 and the first encoder 210. The processor 102 can initialize the first learnable weights matrix 230 with a random variety of weights equal to the shape of the first independent latent space 220. Additionally, the processor 102 can generate a second learnable weights matrix 232 associated with the second image set 204 and the second encoder 212. The processor 102 can initialize the second learnable weights matrix 232 with a random variety of weights equal to the shape of the second independent latent space 222.

In embodiments, the processor 102 can generate a third learnable weights matrix 234 associated with the third image set 206 and the third encoder 214. The processor 102 can initialize the third learnable weights matrix 234 with a random variety of weights equal to the shape of the third independent latent space 224. In examples, the processor 102 can generate a fourth learnable weights matrix 236 associated with the fourth image set 208 and the fourth encoder 216. The processor 102 can initialize the fourth learnable weights matrix 236 with a random variety of weights equal to the shape of the fourth independent latent space 226.

Further, the system 200 (e.g., processor 102), after multiplying by the learnable weights matrices 230, 232, 234, 236, can combine the resulting independent latent spaces 220, 222, 224, 226 to form a common latent space (Z) 240 representative of the first independent latent space 220, the second independent latent space 222, the third independent latent space 224, and the fourth independent latent space 226. The system 200 can combine the independent latent spaces 220, 222, 224, 226 via concatenation (e.g., where the various decoders can read information from the ordered matrix of the correlating encoder), or addition to arrive at the common latent space 240. In embodiments, the system 200 can combine the independent latent spaces 220, 222, 224, 226 via matrix addition to arrive at a common latent space 240 having a size equal to the size of the individual latent spaces 220, 222, 224, 226. The common latent space 240 can be accessed or transmitted via the network 126 and/or the additional network 130. The space (data) occupied by the common latent space 240 can be substantially less than the space occupied by the combination of the independent latent spaces 220, 222, 224, 226. The common latent space 240 can be expressed by Equation (2):

$$Z=\frac{1}{n}\sum_{i=1}^{n} z_i \times \omega.$$

With embodiments, the decoder component(s) 124 (see, FIG. 1) can include a first decoder 250 associated with the first encoder 210, a second decoder 252 associated with the second encoder 212, a third decoder 254 associated with the third encoder 214, and a fourth decoder 256 associated with the fourth encoder 216. The decoders 250, 252, 254, 256 can take samples from the probability distributions as defined by the common latent space 240 and can predict the corresponding independent latent spaces 220, 222, 224, 226 (e.g., generated by the encoders 210, 212, 214, 216) after passing through a layer of learnable decoder weights (e.g., internal to the decoders 250, 252, 254, 256 and associated with the learnable weights matrices 230, 232, 234, 236 of the encoders 210, 212, 214, 216).

Figure 4:
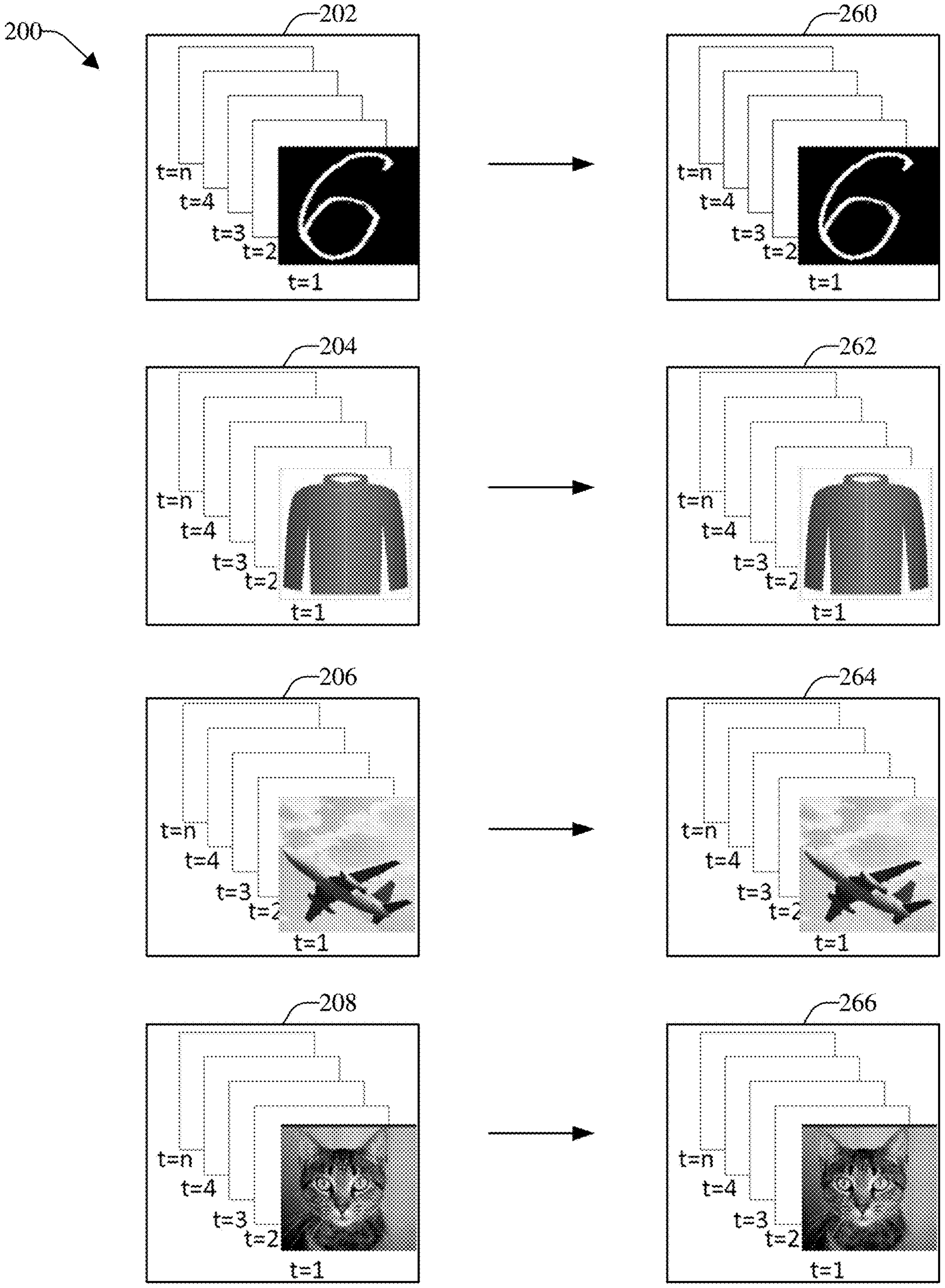
FIG. 4 illustrates a diagram of example, non-limiting system that can facilitate receiving input image sets and generating reconstructed image sets, in accordance with one or more embodiments described herein.

Further, such as generally illustrated in FIGS. 2, 3, and 4, the first decoder 250 can generate a first reconstructed image set 260 corresponding to the first image set 202. The system 200 can verify whether the first reconstructed image set 260 is substantially similar to the first image set 202. Similarly, the second decoder 252 can generate a second reconstructed image set 262 corresponding to the second image set 204. The system 200 can verify whether the second reconstructed image set 262 is substantially similar to the second image set 204.

Additionally, the third decoder 254 can generate a third reconstructed image set 264 corresponding to the third image set 206. The system 200 can verify whether the third reconstructed image set 264 is substantially similar to the third image set 206. The fourth decoder 256 can generate a fourth reconstructed image set 266 corresponding to the fourth image set 208. The system 200 can verify whether the fourth reconstructed image set 266 is substantially similar to the fourth image set 208. Further, in evaluating the performance of the system 200, the system 200 can consider one or more of a variety of loss variables in forward propagation. With various embodiments, the reconstructed image sets 260, 262, 264, 266 can be expressed by the following Equation (3): $x'=\sigma'(W'z_n+b')$.

Figure 5:
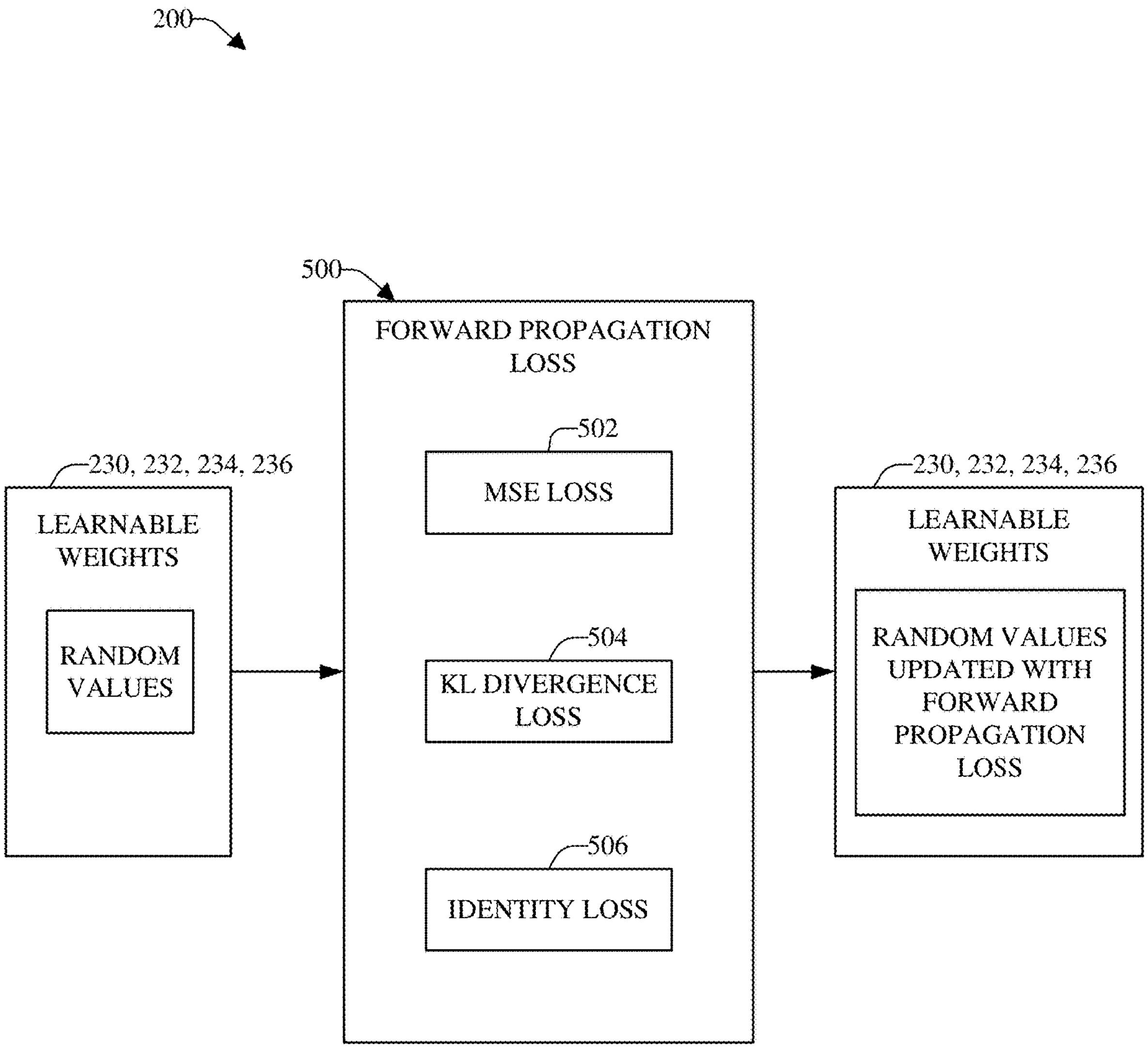
FIG. 5 illustrates a block diagram of an example, non-limiting system that can facilitate determining forward propagation loss as a combination of MSE loss, divergence loss, and identity loss, in accordance with one or more embodiments described herein.

In embodiments, such as explained above, the system 200 can be considered efficient and/or trained if the image sets 202, 204, 206, 208 are substantially similar to the reconstructed image sets 260, 262, 264, 266. If the images are not substantially similar, the system 200 can consider the forward propagation loss of the system 200. Such as generally illustrated in FIG. 5, the forward propagation loss 500 (e.g., overall loss) of the system 200 can be expressed as the combination of a first loss, a second loss, and a third loss. The first loss can be the means squared error (MSE) loss 502, the second loss can be the divergence loss 504, and the third loss can be the identity loss 506.

With embodiments, the MSE loss 502 can be the differential loss of the system 200. The processor 102 can calculate the MSE loss 502 of the system 200 by calculating the error between pixels (e.g., each pixel) of the image sets 202, 204, 206, 208 (e.g., the input) and the pixels of the reconstructed image sets 260, 262, 264, 266. The MSE loss 502 can be considered present within the system 200 if there is a variation in the pixel intensity (e.g., as determined by the processor 102 and/or system 200). The system 200 can adjust the values of the learnable weights matrices 230, 232, 234, 236 to minimize the MSE loss 502. The MSE loss 502 can be expressed by the following Equation (4): $L_n(x, x')=\|x-x'\|^2=\|x-\sigma'(W'(\sigma(W_x+b))+b')\|^2$. Further, x and x' can represent variations of the input images (e.g., the image sets 202, 204, 206, 208) and/or altered images sets sent to the encoders 210, 212, 214, 216.

In examples, such as illustrated in FIG. 5, the system 200 can determine the divergence loss 504 of the system 200. The processor 102 can calculate the divergence loss 504 (e.g., Kullback-Leibler (KL) divergence loss) of the system 200 by identifying the difference between the probability distribution of pixels of the reconstructed image sets 260, 262, 264, 266 and the probability distribution of pixels in the (input) image set 202, 204, 206, 208. By comparing the probability distribution of pixel intensities, the divergence loss 504 can ignore a false loss due to intensities that are less intense in the output when the handwritten digit can be read in the reconstructed image set; and can recognize a true loss when the handwritten digit cannot be discernable/read. With embodiments, the system 200 can identify and express the divergence loss 504 by the following Equation (5):

$$D_{KL}(P\|Q) = -\sum_x p(x)\log\left(\frac{q(x)}{p(x)}\right).$$

Figure 6:
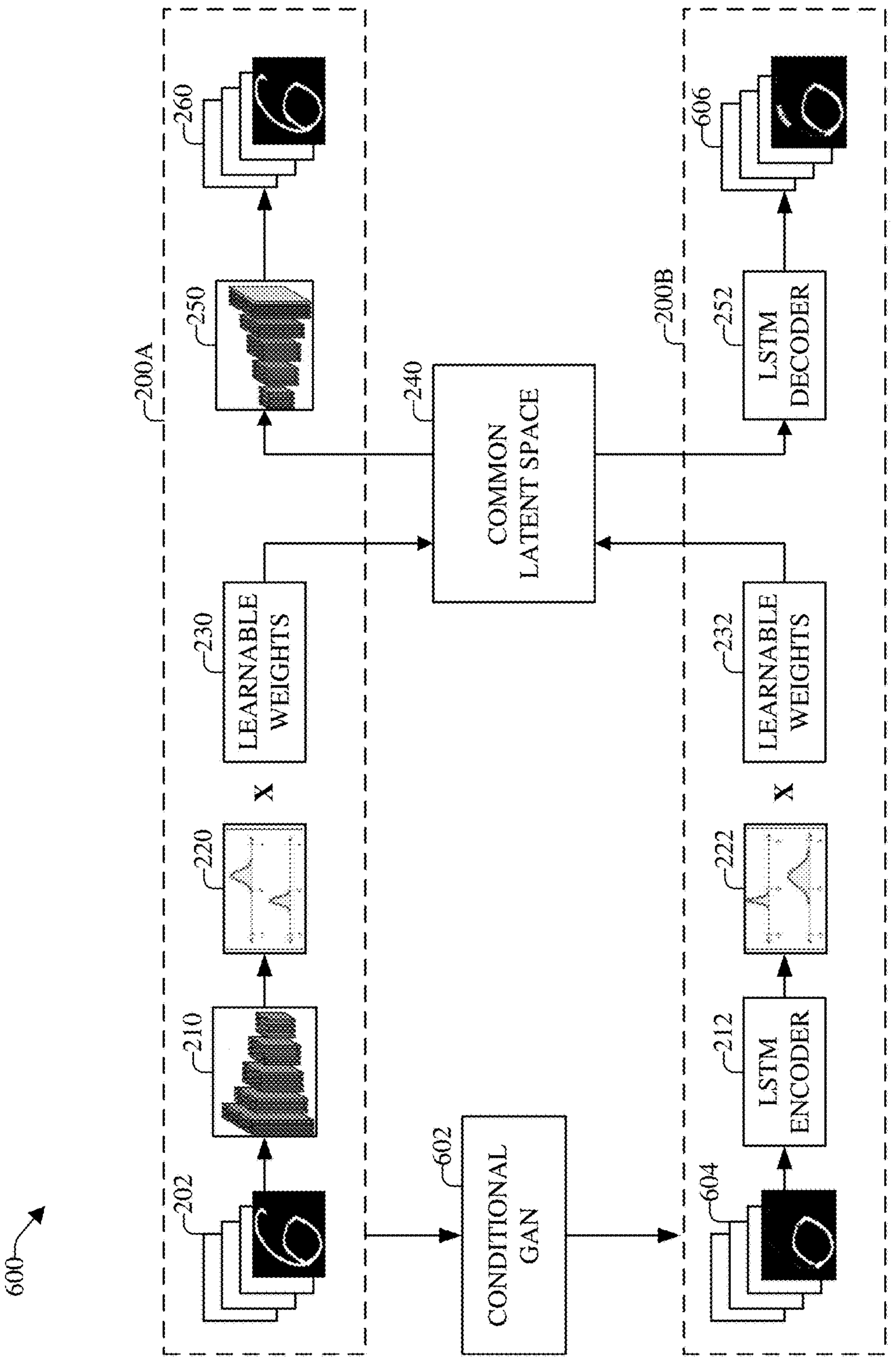
FIG. 6 illustrates a block diagram of an example, non-limiting system that can facilitate determining identity loss by generating an altered image set via a conditional generative adversarial network, in accordance with one or more embodiments described herein.

With embodiments, such as generally illustrated in FIGS. 5 and 6, the system 200 can determine the identity loss 506 of the system 200 to reduce overall forward/backward propagation loss 500. Further, the identity loss 506 of the system 200 can be calculated by running batches in each epoch 600 demonstrated in FIG. 6 after determining the MSE loss 502 and the divergence loss 504 of the system 200. The system 200 can include a conditional generative adversarial network (GAN) 602 coupled to the first image set 202, the first encoder 210, the second image set 204, the second encoder 212, the third image set 206, the third encoder 214, the fourth image set 208, and the fourth encoder 216 (e.g., see FIG. 6). The conditional GAN 602 can generate an altered image set 604 of the first image set 202 (e.g., or any other image set). In examples, the system 200 can generate altered image sets for each of the image sets 202, 204, 206, 208 to be received by the encoders 210, 212, 214, 216 (e.g., to verify that the decoders 250, 252, 254, 256 decode only the features of the corresponding encoder 210, 212, 214, 216 and do not represent any features of other encoders 210, 212, 214, 216). The altered image set 604 can include one or more (e.g., visual) differences with respect to the first image set 202. The system 200 can transmit the altered image set 604 to the second encoder 212 to verify that the corresponding decoder (e.g., the second decoder 252) can learn the one or more differences, and the system 200 can compare the output images 606 with the altered image set 604 (e.g., the input to the second decoder 252), by which MSE loss 502 can be calculated. Such can be repeated for the remainder of the encoders 210, 212, 214, 216 and decoders 250, 252, 254, 256 to reduce identity loss 506 and calculate MSE loss 502 during backwards propagation of the system 200.

With embodiments, the altered image set 604 can be received by the other encoders of the encoder component(s) 120 (e.g., the third encoder 214 and/or the fourth encoder 216). Additionally, the conditional GAN 602 can generate one or more altered image sets to correspond with the second image set 204, the third image set 206, and the fourth image set 208 (e.g., or any number of image sets) to further determine the identity loss 506 of the system 200. The above forward and backward propagation can be utilized and repeated to validate when no decoder can decode information from an uncorrelated encoder (e.g., by confirming that no decoder can decode information from an uncorrelated image set). The losses resulting from running batches in each epoch 600 can be reduced by adjusting values of the learnable weights matrices 230, 232, 234, 236 (to account for forward/backward propagation loss). Epoch 600 can be repeated (e.g., by running batches) until a saturation point is reached, where the decoders 250, 252, 254, 256 reconstruct images in relation to the correlating encoder 210, 212, 214, 216, and no other encoders (e.g., when the system can be considered to be trained and overall loss 500 can be at a global minimum).

In embodiments, the system 200, processor 102, and/or a specific decoder can save noise samples from other decoders in effort to minimize losses over multiple iterations. The decoder-specific noise samples can be applied by the decoder to reduce interference from receiving incorrect image sets to train the decoders in reducing forward propagation loss. The image sets 202, 204, 206, 208 and the one or more altered image sets can be sent at the same time through the encoders 210, 212, 214, 216 and decoders 250, 252, 254, 256.

With embodiments, the system 200 can reduce the forward propagation loss 500 until an equilibrium is reached (e.g., a global minimum value for loss). The equilibrium can be a state where the sum of losses (e.g., the MSE loss 502, the divergence loss 504, and the identity loss 506) cannot be further reduced by running additional batches. Further, the system 200 can be in equilibrium when the first decoder 250 can define the characteristics of the first encoder 210 and does not define the characteristics of the second encoder 212, the third encoder 214, or the fourth encoder 216. Further, the system 200 can be in equilibrium when the second decoder 252 can define the characteristics of the second encoder 212 and does not define the characteristics of the first encoder 210, the third encoder 214, or the fourth encoder 216. The system 200 can additionally be in equilibrium when the third decoder 254 can define the characteristics of the third encoder 214 and does not define the characteristics of the first encoder 210, the second encoder 212, or the fourth encoder 216. The system 200 can also be in equilibrium when the fourth decoder 256 can define the characteristics of the fourth encoder 216 and does not define the characteristics of the first encoder 210, the second encoder 212, or the third encoder 214.

In further examples and embodiments, additional encoder and decoder pairs (or any number of additional encoders or decoders) can be added to the system 200 until equilibrium is disturbed. The additional encoder and decoder pairs can be trained (e.g., using transfer learning) while the previously trained encoder and decoder pairs can be frozen (such that learnable weight matrices remain the same). In such a manner, the previously tuned encoder and decoder pairs can be unaffected by the additional encoder and decoder pairs during tuning of the additional encoder and decoder pairs. The system 200 can be expanded in such a manner to include any number of encoders and decoders.

With additional examples and embodiments, the encoders 210, 212, 214, 216 can receive one or more video data sets (e.g., from a video streaming or transmission source). The video data sets can be transmitted to the respective encoders 210, 212, 214, 216 over the network 126, the additional network 130, or via an antenna/cable. The common latent space 240 can represent a latent probability distribution of the different multi-dimensional videos which can be identified and decoded by the respective decoders 250, 252, 254, 256. For instance, a display medium (e.g., a glass surface) can include one or more decoders 250, 252, 254, 256 to display one or more of the video data sets.

Figure 7A:
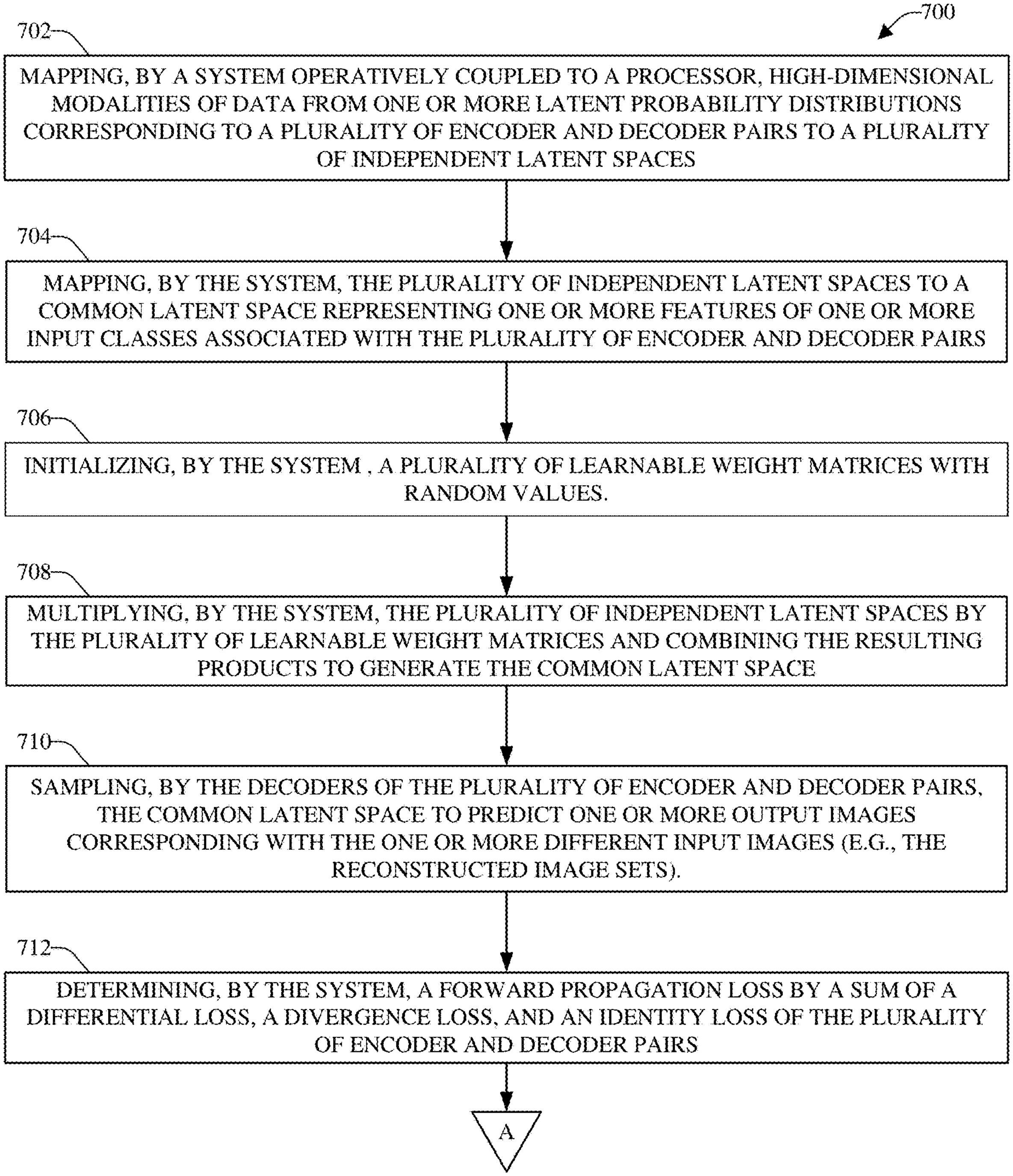
FIGS. 7A and 7B illustrate a flow diagram of an example, non-limiting computer implemented method for learning a model for clustered encoding and decoding from a latent probability distribution, in accordance with one or more embodiments described herein.
Figure 7B:
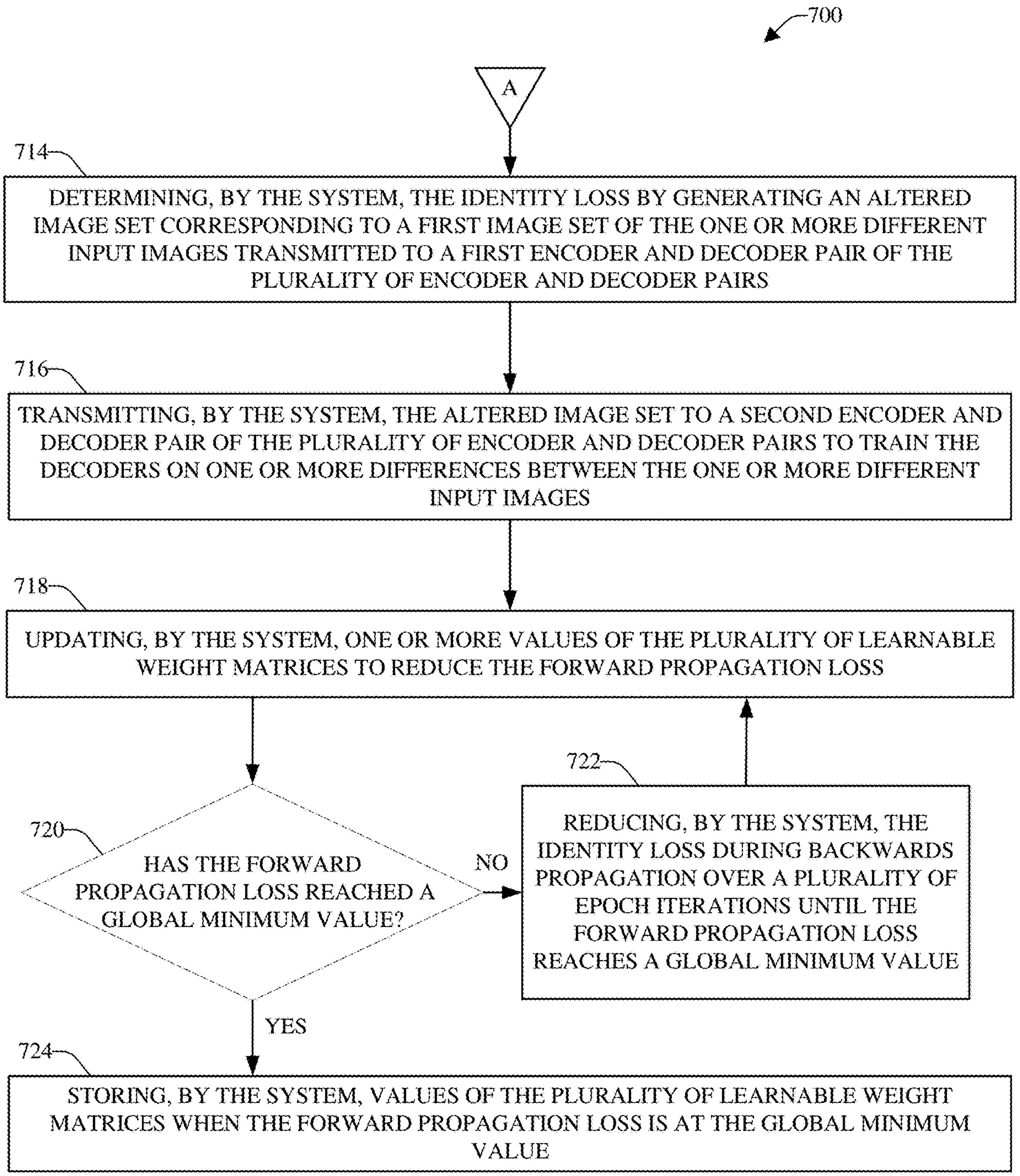

Referring next to FIGS. 7A and 7B, a flow diagram is illustrated showing an example, non-limiting method 700 that can learn a model for clustered encoding and decoding from a latent probability distribution, in accordance with one or more embodiments described herein. Repetitive description of like elements and/or processes employed in respective embodiments is omitted for sake of brevity.

At 702, the non-limiting method 700 can comprise mapping, by a system 100 operatively coupled to the processor 102, high-dimensional modalities of data from one or more latent probability distributions corresponding to a plurality of encoder and decoder pairs to a plurality of independent latent spaces.

At 704, the non-limiting method 700 can comprise mapping, by the system 100, the plurality of independent latent spaces to a common latent space representing one or more features of one or more input classes associated with the plurality of encoder and decoder pairs. Further, the latent probability distribution can represent a likelihood of different multi-dimensional images input (e.g., the image sets) to each encoder of the plurality of encoder and decoder pairs via multi-stage latent learning. A first quantity of independent latent spaces can be the same as a second quantity of the plurality of encoder and decoder pairs. The plurality of encoder and decoder pairs can learn characteristics of one or more input images fed to the plurality of the encoder and decoder pairs at the same time. Additionally, the plurality of encoder and decoder pairs can encode and decode spatial and temporal features of the one or more different input images (e.g., the image sets).

At 706, the non-limiting method 700 can comprise initializing, by the system 100, a plurality of learnable weight matrices with random values.

At 708, the non-limiting method 700 can comprise multiplying, by the system 100, the plurality of independent latent spaces by the plurality of learnable weight matrices and combining the resulting products to generate the common latent space.

At 710, the method 700 can comprise sampling, by the decoders of the plurality of encoder and decoder pairs, the common latent space to predict one or more output images corresponding with the one or more different input images (e.g., the reconstructed image sets).

At 712, the non-limiting method 700 can comprise determining, by the system 100, a forward propagation loss by a sum of a differential loss, a divergence loss, and an identity loss of the plurality of encoder and decoder pairs.

It is noted that FIG. 7A and FIG. 7B are linked by linking triangle A.

At 714, the non-limiting method 700 can comprise determining, by the system 100, the identity loss by generating an altered image set corresponding to a first image set of the one or more different input images transmitted to a first encoder and decoder pair of the plurality of encoder and decoder pairs.

At 716, the non-limiting method 700 can comprise transmitting, by the system 100, the altered image set to a second encoder and decoder pair of the plurality of encoder and decoder pairs to train the decoders on one or more differences between the one or more different input images.

At 718, the non-limiting method 700 can comprise updating, by the system 100, one or more values of the plurality of learnable weight matrices to reduce the forward propagation loss.

At 720, the non-limiting method 700 can determine whether the forward propagation loss has reached a global minimum value. The global minimum value can be reached when the system is in equilibrium (e.g., a point where the losses cannot be further reduced), which can be tuned via a hyper-parameter, the learnable weight matrices.

At 722, if the forward propagation loss has not reached a global minimum value, the non-limiting method 700 can comprise reducing, by the system 100, the identity loss during backwards propagation over a plurality of epoch iterations until the forward propagation loss reaches a global minimum value. The non-limiting method 700 can further include updating the one or more values of the plurality of learnable weight matrices to reduce the forward propagation loss (as shown in step 718, which can be reiterated via decision block 720 until the global minimum loss can be achieved).

At 724, the non-limiting method 700 can comprise storing, by the system 100, values of the plurality of learnable weight matrices when the forward propagation loss is at the global minimum value.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

Turning next to FIG. 8, a detailed description is provided of additional context for the one or more embodiments described herein at FIGS. 1-7B.

FIG. 8 and the following discussion are intended to provide a brief, general description of a suitable computing environment 800 in which one or more embodiments described herein at FIGS. 1-7B can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as multi-stage latent learning code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 2000, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method can be distributed among multiple computers and/or between multiple locations. On the other hand, in this presentation of computing environment 800, detailed discussion is focused on a single computer, specifically computer 801, to keep the presentation as simple as possible. Computer 801 can be located in a cloud, even though it is not shown in a cloud in FIG. 8. On the other hand, computer 801 is not required to be in a cloud except to any extent as can be affirmatively indicated.

PROCESSOR SET 810 includes one, or more, computer processors of any type now known or to be developed in the future. Processing circuitry 820 can be distributed over multiple packages, for example, multiple, coordinated integrated circuit chips. Processing circuitry 820 can implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set can be located "off chip." In some computing environments, processor set 810 can be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods can be stored in block 2000 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory can be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 can be a read only memory (ROM), but typically at least a portion of the persistent storage allows writing of data, deletion of data and re-writing of data. Some familiar forms of persistent storage include magnetic disks and solid-state storage devices. Operating system 822 can take several forms, such as various known proprietary operating systems or open-source Portable Operating System Interface type operating systems that employ a kernel. The code included in block 2000 typically includes at least some of the computer code involved in performing the inventive methods.

PERIPHERAL DEVICE SET 814 includes the set of peripheral devices of computer 801. Data communication connections between the peripheral devices and the other components of computer 801 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 can include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 can be persistent and/or volatile. In some embodiments, storage 824 can take the form of a quantum computing storage device for storing data in the form of qubits. In embodiments where computer 801 is required to have a large amount of storage (for example, where computer 801 locally stores and manages a large database) then this storage can be provided by peripheral storage devices designed for storing large amounts of data, such as a storage area network (SAN) that is shared by multiple, geographically distributed computers. IoT sensor set 825 is made up of sensors that can be used in Internet of Things applications. For example, one sensor can be a thermometer and another sensor can be a motion detector.

NETWORK MODULE 815 is the collection of computer software, hardware, and firmware that allows computer 801 to communicate with other computers through WAN 802. Network module 815 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801) and can take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 can be a client device, such as thin client, heavy client, mainframe computer and/or desktop computer.

REMOTE SERVER 804 is any computer system that serves at least some data and/or functionality to computer 801. Remote server 804 can be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data can be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs can be stored as images and can be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware and firmware allowing public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A computer implemented method for learning a model for clustered encoding and decoding from a latent probability distribution, comprising:

mapping, by a system operatively coupled to a processor, high-dimensional modalities of data from one or more latent probability distributions corresponding to a plurality of encoder and decoder pairs to a plurality of independent latent spaces; and mapping, by the system, the plurality of independent latent spaces to a common latent space representing one or more features of one or more input classes associated with the plurality of encoder and decoder pairs, wherein the latent probability distribution represents a likelihood of different multi-dimensional images input to each encoder of the plurality of encoder and decoder pairs via multi-stage latent learning;

initializing, by the system, a plurality of learnable weight matrices with random values; and multiplying, by the system, the plurality of independent latent spaces by the plurality of learnable weight matrices and combining the resulting products to generate the common latent space.

2. The computer implemented method of claim 1, wherein a first quantity of independent latent spaces is the same as a second quantity of the plurality of encoder and decoder pairs.

3. The computer implemented method of claim 1, wherein the plurality of encoder and decoder pairs learn characteristics of one or more different input images fed to the plurality of encoder and decoder pairs at the same time.

4. The computer implemented method of claim 3, wherein the plurality of encoder and decoder pairs encode and decode spatial and temporal features of the one or more different input images.

5. The computer implemented method of claim 4, wherein the plurality of encoder and decoder pairs each correspond with an image class from the one or more different input images.

6. The computer implemented method of claim 5, further comprising sampling, by the decoders of the plurality of encoder and decoder pairs, the common latent space to predict one or more output images corresponding with the one or more different input images.

7. The computer implemented method of claim 6, further comprising determining, by the system, a forward propagation loss by a sum of a differential loss, a divergence loss, and an identity loss of the plurality of encoder and decoder pairs.

8. The computer implemented method of claim 7, wherein the identity loss is a means squared loss.

9. The computer implemented method of claim 8, further comprising:

determining, by the system, the identity loss by generating an altered image set corresponding to a first image set of the one or more different input images transmitted to a first encoder and decoder pair of the plurality of encoder and decoder pairs; and transmitting, by the system, the altered image set to a second encoder and decoder pair of the plurality of encoder and decoder pairs to train the decoders of the plurality of encoder and decoder pairs on one or more differences between the one or more different input images.

10. The computer implemented method of claim 9, further comprising:

updating, by the system, one or more values of the plurality of learnable weight matrices to reduce the forward propagation loss.

11. The computer implemented method of claim 9, further comprising:

reducing, by the system, the identity loss during backwards propagation over a plurality of epoch iterations until the forward propagation loss reaches a global minimum value; and storing, by the system, values of the plurality of learnable weight matrices when the forward propagation loss is at the global minimum value.

12. The computer implemented method of claim 11, wherein the plurality of epoch iterations each include a batch where an input image of the one or more different input images is transmitted through each of the plurality of encoder and decoder pairs at the same time.

13. The computer implemented method of claim 12, wherein the system is in a state of equilibrium when each decoder of the plurality of encoder and decoder pairs defines only characteristics of a corresponding encoder coupled to each decoder, and when the forward propagation loss reaches the global minimum value.

14. A computer program product for learning a model for clustered encoding and decoding from a latent probability distribution, the computer program product comprising a computer readable storage medium having program instructions embodied therewith, the program instructions executable by a processor to cause the processor to:

map, by the processor, high-dimensional modalities of data from one or more latent probability distributions corresponding to a plurality of encoder and decoder pairs to a plurality of independent latent spaces; and map, by the processor, the plurality of independent latent spaces to a common latent space representing one or more features of one or more input classes associated with the plurality of encoder and decoder pairs, wherein the latent probability distribution represents a likelihood of different multi-dimensional images input to each of encoder of the plurality of encoder and decoder pairs via multi-stage latent learning;

and multiply, by the processor, the plurality of independent latent spaces by a plurality of learnable weight matrices and combine, by the processor, the resulting products to generate the common latent space.

15. The computer program product of claim 14, wherein the plurality of encoder and decoder pairs learn characteristics of one or more different input images fed to the plurality of encoder and decoder pairs at the same time.

16. The computer program product of claim 15, wherein the plurality of encoder and decoder pairs encode and decode spatial and temporal features of the one or more different input images.

17. The computer program product of claim 16, wherein the combining is of the resulting products by addition or concatenation to generate the common latent space, and wherein the plurality of learnable weight matrices are initialized with random values.

18. The computer program product of claim 17, wherein decoders of the plurality of encoder and decoder pairs sample the common latent space to predict one or more output images corresponding with the one or more different input images.

19. A system for learning a model for clustered encoding and decoding from a latent probability distribution, comprising:

a memory that stores computer executable components; and a processor that executes the computer executable components stored in the memory, wherein the computer executable components comprise:

a plurality of encoder and decoder pairs that map high-dimensional modalities of data from a latent probability distribution to a plurality of independent latent spaces, wherein the processor can combine the plurality of independent latent spaces to generate a common latent space that represents one or more features of one or more input classes associated with the plurality of encoder and decoder pairs; and the latent probability distribution represents a likelihood of different multi-dimensional images input to each encoder of the plurality of encoder and decoder pairs via multi-stage latent learning; and wherein the processor initializes a plurality of learnable weight matrices with a random variety of weights equal to a shape of a first one of the plurality of independent latent spaces, and wherein the processor multiplies the plurality of independent latent spaces by the plurality of learnable weight matrices and combines the resulting products to generate the common latent space.

* * * * *